May 14, 1968  D. A. DAVIS, JR  3,382,991
VEHICLE STORAGE APPARATUS
Filed Sept. 21, 1965
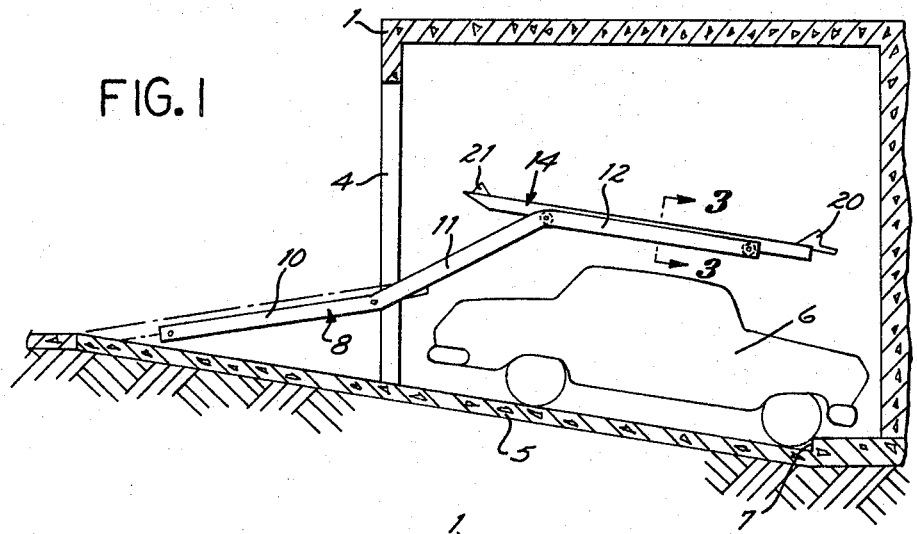
FIG. 1
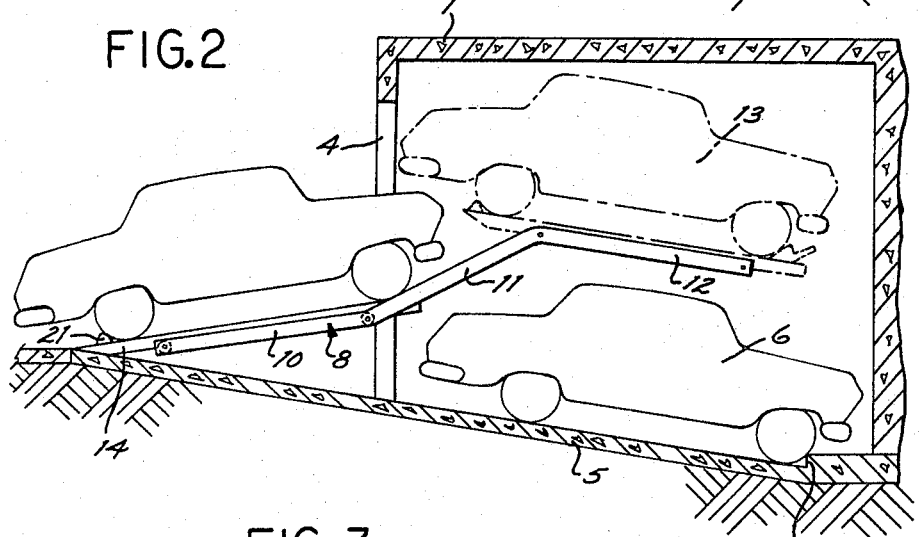
FIG. 2
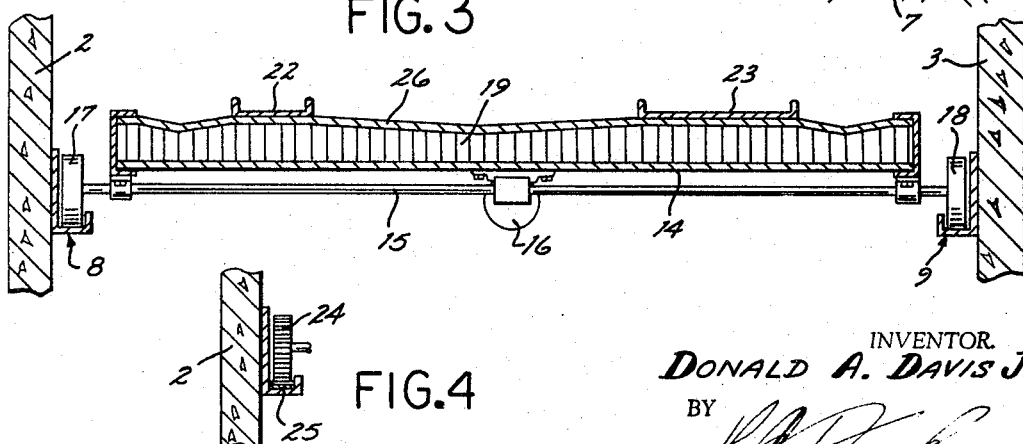
FIG. 3
FIG. 4
INVENTOR.
DONALD A. DAVIS JR.
BY
ATTORNEY United States Patent Office 3,382,991
Patented May 14, 1968

3,382,991
VEHICLE STORAGE APPARATUS
Donald A. Davis, Jr., 39 Nieto Ave.,
Long Beach, Calif. 90803
Filed Sept. 21, 1965, Ser. No. 488,932
2 Claims. (Cl. 214—16.1)

ABSTRACT OF THE DISCLOSURE

In order to store automobiles within a limited space the vehicles are positioned one immediately above the other, and the uppermost vehicle resting upon an inclined track, which permits the uppermost vehicle to rest safely in a superimposed position to the lower vehicle and still permitting either of the vehicles to be moved into or out of parked position without interfering with the adjacent vehicle.

---

This invention relates to a vehicle storage apparatus, particularly useful in private garages, carports, or storage areas where ground space is limited, but where a building code requires a definite number of parking units per apartment or living unit.

An object of my invention is to provide a novel means whereby vehicles may be parked, one above the other, to thus double the number of vehicles which can be parked in a given space.

Another object of my invention is to provide a novel superimposed parking construction whereby either the upper or the lower vehicle can be moved without interfering with the parked vehicle.

Still another object is to provide a novel vehicle storage apparatus which is simple in construction and effective in operation.

Other objects, advantages and features of invention may appear from the accompanying drawing, the subjoined detailed description and the appended claims.

IN THE DRAWING

FIGURE 1 is a vertical sectional view of my vehicle storage apparatus.

FIGURE 2 is a view similar to FIGURE 1 but showing the vehicles in different positions.

FIGURE 3 is an enlarged sectional view taken on line 3—3 of FIGURE 1.

FIGURE 4 is a fragmentary vertical sectional view of a modified form of track.

Referring more particularly to the drawing, the numeral 1 indicates a garage structure which includes side walls 2 and 3 and a front door or opening 4 through which the vehicles move, as will be subsequently described. The floor 5 of the garage is sloped downwardly into the garage 1 so that one vehicle will be parked at a forwardly inclined angle, as shown symbolically at 6. A stop 7 is provided in the floor 5 at the inner end thereof to provide a shoulder against which the front tires of the vehicle rest when it is parked.

It is obvious that the garage 1 may either be an inclosed structure as illustrated, or it may be an outdoor carport, or merely an open parking area, as might be desired. A pair of tracks 8 and 9 are fixedly attached to the side walls 2–3, or these tracks may be supported on vertical columns. The tracks 8–9 are spaced horizontally a sufficient distance to permit ready movement of and access to the lower vehicle 6. The tracks 8–9 are preferably J-shaped in cross-section, and the inner horizontal surface of the track may be roughened, serrated, or may have gear teeth or a rack thereon. The tracks 8 and 9 extend upwardly at an angle, or with a continuous curve as shown at 10 and 11. A third portion of the track 12 is preferably curved downwardly at a slight angle, so that the second vehicle 13 will be parked at a slight vertical angle to insure that the force of gravity will tend to hold the vehicle in its parked position, as will be subsequently described.

A power driven parking dolly 14 has a power shaft 15 mounted transversely on the bottom thereof. This shaft is driven by an electric motor 16, or similar motive power. A pair of driving wheels 17–18 are mounted one on each end of the shaft 15, and these wheels rest in the tracks 8 and 9 respectively. When the shaft 15 is rotated the dolly 14 will be moved either upwardly or downwardly on the tracks 8–9, and will carry the vehicle 13 to its parked or drive-away position. The dolly 14 includes a platform 19, preferably formed of light material such as aluminum or wood, or synthetic materials. The reason for this construction is to reduce the weight of the dolly and the consequent load on the walls or floor of the garage. The dolly 14 is provided with a wheel stop 20 at the forward end thereof against which the front wheels of the vehicle will rest. A back wheel rest 21 is also provided at the rear of the dolly, which will hold the vehicle in position while it is being moved either into or out of the garage. This rear stop 21 may be tripped and lowered in the position shown in FIGURE 2, so that the vehicle can drive off of the dolly. A pair of tracks 22–23 are mounted on top of the dolly 14 to receive the wheels of the vehicle which is being parked. One track 23 may be somewhat wider than the other to accommodate different tread widths of vehicles.

If desired, the wheels 17–18 may be rubber tired or these may be in the shape of a gear, as shown at 24. The gear 24 then meshes with a rack 25 in the side tracks, which will elevate the vehicle without danger of the supporting wheels slipping due to the weight of the vehicle.

The upper surface of the dolly 14 is provided with metal, fabric or synthetic drip pan 26 to catch any oil that might drip from the upper vehicle 13.

IN OPERATION

The tracks 8–9 are sufficiently spaced horizontally so that the bottom vehicle 6 can easily drive between them. When the second vehicle 13 is parked, the dolly 14 will be in the position shown in solid lines in FIGURE 1. Consequently, the lower vehicle can be easily reached. Also if the upper vehicle 13 is to be used, the lower vehicle 6 can remain in the position shown in FIGURE 2, and the dolly 14 will lower the vehicle 13 on the tracks 8–9 to the position shown in solid lines in FIGURE 2, whereupon the vehicle can be driven away. The dolly 14 in the meantime is again raised to the position shown in solid lines in FIGURE 1, so as not to interfere with the movement of the lower vehicle 6.

Having described my invention, I claim:

1. A vehicle storage apparatus comprising a single pair of horizontally spaced rails, said rails being inclined upwardly, means fixedly supporting said rails, a dolly, wheels on the dolly movable on said rails, power means connected to said wheels to drive the same, and wherein the inner ends of the rails are positioned above the roof level of a vehicle stored between the rails and below the level of the inner ends of the rails, the ground level between the rails being inclined downwardly from the forward end of said rails, a stop on said ground level at the inner end thereof against which a vehicle may rest, the means fixedly supporting the rails being the side walls of a garage inclosing the vehicle, and the inner ends of said rails being inclined downwardly, a stop means on said dolly, said inclination of the rails urging a vehicle against the stop means within parked position.

2. A vehicle storage apparatus comprising a single pair of horizontally spaced rails, each rail at their forward ends having an upwardly inclined first section, a second inclined section connected to the rear end of said first section and having a greater upward inclination than the first section, and a third section at the rear end of said second section and having a downward inclination to the rearward end of the rails, means fixedly supporting said rails, a dolly, wheels on the dolly movable on said rails, and power means connected to said wheels to drive the same, the inner ends of the rails are positioned above the roof level of a vehicle stored between the rails and below the level of the innermost ends of the rails, and the ground level between the rails is inclined downwardly from the forward end of said rails, and the means fixedly supporting the rails being the side walls of a garage enclosing the vehicle.

References Cited
UNITED STATES PATENTS

| | | | |
|---|---|---|---|
| 2,507,887 | 5/1950 | Cheney | 187—12 |
| 2,674,347 | 4/1954 | Thompson | 187—12 |
| 3,270,898 | 9/1966 | Kuipers | 187—12 X |
| 3,277,978 | 10/1966 | Stone | 187—12 |

FOREIGN PATENTS

| | | |
|---|---|---|
| 1,320,651 | 1/1963 | France. |
| 998,458 | 7/1965 | Great Britain. |

ROBERT G. SHERIDAN, *Primary Examiner.*

GERALD M. FORLENZA, *Examiner.*

R. J. SPAR, *Assistant Examiner.*